United States Patent [19]
Hoffman et al.

[11] Patent Number: 4,894,302
[45] Date of Patent: Jan. 16, 1990

[54] ALKALINE EARTH METAL ANODE-CONTAINING CELL HAVING ELECTROLYTE OF ORGANOMETALLIC ALKALINE EARTH METAL SALT AND ORGANIC SOLVENT

[75] Inventors: Ronald J. Hoffman; Richard C. Winterton; Thomas D. Gregory, all of Midland, Mich.

[73] Assignee: The Dow Chemical Company, Midland, Mich.

[21] Appl. No.: 936,531

[22] Filed: Dec. 1, 1986

Related U.S. Application Data

[63] Continuation-in-part of Ser. No. 744,827, Jun. 14, 1985.

[51] Int. Cl.$^4$ .................. H01M 6/14; C07F 5/02
[52] U.S. Cl. .................. 429/194; 429/198; 568/6
[58] Field of Search .................. 429/194, 198; 568/6

[56] References Cited

U.S. PATENT DOCUMENTS

| | | | |
|---|---|---|---|
| 3,926,669 | 12/1975 | Auburn | 429/198 X |
| 4,009,052 | 2/1977 | Whittingham | 429/191 |
| 4,049,879 | 9/1977 | Thompson et al. | 29/191 |
| 4,060,674 | 11/1977 | Klemann | 429/198 X |
| 4,069,372 | 11/1978 | Voinov | 429/198 X |
| 4,082,810 | 4/1978 | Brown | 568/6 |
| 4,104,451 | 8/1978 | Klemann | 429/194 |
| 4,164,450 | 8/1978 | Whitney et al. | 429/198 X |
| 4,231,896 | 11/1980 | Malpass | 252/431 R |
| 4,279,976 | 7/1981 | Klemann et al. | 429/198 X |
| 4,293,623 | 10/1981 | Klemann et al. | 429/198 X |
| 4,325,840 | 4/1982 | Malpass | 252/431 R |
| 4,511,642 | 4/1985 | Higashi | 430/161 |
| 4,731,309 | 3/1988 | Hoffman | 429/52 X |

Primary Examiner—Stephen J. Kalafut
Attorney, Agent, or Firm—Andrew E. Pierce

[57] ABSTRACT

Alkaline earth metal anode cells having an intercalation cathode, a nonaqueous liquid electrolyte comprising (a) an organic solvent, for instance, an ether, an ester, a sulfone, an organic sulfide, an organic sulfate, a tertiary amine, an organic nitrite, and an organic nitrate, and (b) at least one of an electrolytically active alkaline earth metal salt comprising an organometallic alkaline earth metal salt represented by the formula:

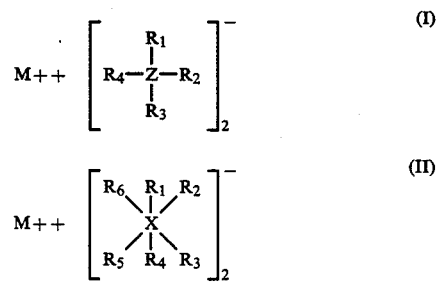

wherein Z is selected from the group consisting of boron and aluminum; X is selected from the group consisting of phosphorus and arsenic; M is an alkaline earth metal; and in which $R_1$–$R_6$ are radicals independently selected from the following groups: alkyl, aryl, alkaryl, aralkyl, alkenyl, cycloalkyl, allyl, heterocyclic alkyl, and cyano, with the proviso that $R_1$–$R_6$ cannot be all alkyl or all aryl and triarylalkylborate or aluminate anions, and trialkylarylborate or aluminate anions are excluded and M represents an alkaline earth metal.

11 Claims, 1 Drawing Sheet

ALKALINE EARTH METAL ANODE-CONTAINING CELL HAVING ELECTROLYTE OF ORGANOMETALLIC ALKALINE EARTH METAL SALT AND ORGANIC SOLVENT

CROSS REFERENCE TO RELATED APPLICATION

This is a continuation-in-part of application Ser. No. 744,827, filed June 14, 1985.

BACKGROUND OF THE INVENTION

1. Field of the Invention

This invention relates to secondary electrochemical cells utilizing a nonaqueous, liquid electrolyte, an alkaline earth metal anode and a cathode capable of intercalation.

2. Description of the Prior Art

High energy density, rechargeable electrochemical cells have been recently developed having an alkali metal anode-active material, a transition metal chalcogenide cathode-active material, and a mixture of a lithium salt, such as lithium perchlorate, dissolved in an organic solvent as the electrolyte.

While a rechargeable cell is theoretically capable of charging and discharging indefinitely, in practice this is not obtained because of dendritic growths on the anode and degradation of the cathode with cycling. The electrolyte can also be a limiting factor, particularly where a nonaqueous electrolyte is utilized. Certain nonaqueous electrolytes can provide good performance with a given anode-cathode couple and be ineffective or be less effective with other anode-cathode couples, either because the electrolyte is not inert or because it degrades during cycling.

To obtain a battery system that is rechargeable at ambient temperatures, there are basically two directions that can be taken in selecting a cathode. The cathode can be a liquid so that reactions can readily take place; but when the cathode is a liquid, provision must be made to keep the cathode active material away from the anode, otherwise self-discharge will occur. The other alternative is to use a solid cathode that is essentially insoluble in the electrolyte but which will absorb and desorb the anode ion since solubility of the anode ion must occur reversibly during operation of the cell. Such a solid cathode, can be capable of intercalation of ions which are solubilized by the electrolyte. The electrolyte must also permit electroplating of solubilized ions at the anode; the plating of ions at the anode occurring during recharge of the cell and the intercalation of the cathode occurring during discharge of the cell.

The research conducted on alkali metal batteries utilizing an intercalation cathode such as titanium disulfide has shown the desirability of utilizing a cathode which is capable of intercalating the solubilized anode ion. The bulk of the literature dealing with intercalation reactions in battery development focuses on the use of the alkali metals, specifically lithium as anodes. In comparison, very little work has been done with respect to the use of alkaline earth metals, such as magnesium, for use as anodes and the use of cathodes capable of intercalation of alkaline earth metal ions.

With respect to insertion of magnesium ions into inorganic materials, there is disclosed in the literature the incorporation of magnesium into materials such as zeolites and graphite, particularly for use in the fields of catalysis and composite materials. In battery development, alkali metal ion intercalation is known to take place in the simple and complex transition metal oxides, sulfides, selenides, and tellurides. Layered transition metal disulfides have been extensively studied. Lithium is known to topochemically react with most of these disulfides, when used as cathodes, in stoichiometric ratios representing capacities of about 250 milliampere hours per gram of cathode material. Laboratory cells in the ten ampere hour range incorporating titanium disulfide as the cathode and lithium as the anode have achieved specific energy densities of 55 watt hours per pound at moderate discharge rates over more than 100 cycles at 50–80 percent discharge depth. Lithium anode cells having metal oxide cathodes have also been tested. Of particular interest as cathodes are molybdenum trioxide, magnanese dioxide, and chromium oxide ($Cr_3O_8$) because such cathodes offer an energy density of about 60 watt hours per pound which is similar to that obtained with titanium disulfide.

Generally, intercalation chemistry is concerned with the insertion of metal guest ions into inorganic host structures. From a chemical standpoint intercalation is considered to be a reversible topotactic redox reaction by electron/ion transfer. Intercalation reactions are commonly viewed as correlating with a change in the electronic (oxidation) state of the host lattice. This oxidation change is typically nonintegral and non-stoichiometric in most compounds capable of intercalation.

With regard to the structure of the host lattice, three basic types are known. (1) A three-dimensional framework structure containing interconnected or isolated empty channels as lattice sites which share polyhedral faces. Examples of this type are the complex vanadium oxides, the trioxides of molybdenum and tungsten and zeolites. (2) Another example of a host lattice structure is a two-dimensional structure consisting of a neutral layered unit as the building block. Between the layers a van der Waals gap exists representing, to a diffusing ion, an array of neighboring vacant lattice positions. Examples of this type of structure are the layered transition metal disulfides. (3) A third type structure is a one-dimensional structure composed of chain type units separated by a van der Waals gap providing neighboring lattice sites. Examples of this type are the transition metal trisulfides. Of the three types, the layered systems (2) offer the greatest flexibility for ion insertion.

Klemann et al in U.S. Pat. No. 4,104,451 and U.S. Pat. No. 4,060,674 disclose alkali metal anode/chalcogenide cathode reversible batteries having organometallic alkali metal salts in combination with organic solvents as electrolytes. Lamellar transition metal chalcogenides, particularly the dichalcogenides are preferred. Titanium disulfide is most preferred for use as a cathode in the disclosed cells. Nonaqueous electrolytes containing alkali metal salts of boron or aluminum containing organic groups are disclosed.

In U.S. Pat. No. 4,069,372 to Voinov, cells are disclosed containing a solid mineral electrolyte capable of allowing selective migration of the anode metal in the form of cations. The electrolyte is coupled with a cathode capable of accepting electrons to form anions by cathodic reduction. Useful cathodes are disclosed as salts of transition metals such as a halide, an oxide, or a sulfide of a metal selected from iron, nickel, cobalt, chromium, copper or vanadium, i.e., ferrous chloride. The anode active material can be a metal from group Ia and IIa of the Periodic Table of the Elements. The electrolyte can be a salt of a metal of group Ia, IIa, IIb, or IIIb of the Periodic Table of the Elements.

Higashi et al in U.S. Pat. No. 4,511,642 disclose organoborate salts of alkali metals represented by the formula:

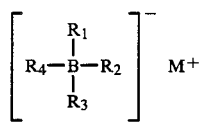

in which $R_1-R_4$ independently represent an alkyl group, an alkenyl group, a cycloalkyl group, an allyl group, an aryl group, a heterocyclic group, or a cyano group and $M+$ represents an alkali metal ion.

Malpass in U.S. Pat. No. 4,231,896 and U.S. Pat. No. 4,325,840 discloses organomagnesium complexes which are hydrocarbon soluble and useful as co-catalysts in combination with conventional Zeigler catalysts for polymerizing olefins, etc. and as a source of ether-free diorganomagnesium compounds.

In no one of these references is the electrochemical cell of the invention disclosed. In addition, there would be no suggestion for the use of an alkaline earth metal such as magnesium or calcium as an anode together with a nonaqueous organic solvent electrolyte containing an organometallic salt of an alkaline earth metal and a cathode capable of intercalation of an alkaline earth metal ion in view of the fact that the alkali metal anodes of the cells of the prior art are much more readily ionized than are alkaline earth metal anodes and therefore one skilled in the art would not expect that a cell containing an alkaline earth metal anode would provide suitable performance in comparison with a cell containing an alkali metal anode. Additionally, on recharge the cell must be capable of re-depositing the anode metal dissolved during discharge in a relatively pure state.

SUMMARY OF THE INVENTION

An electrochemical cell is disclosed which is capable of operation at ambient temperature and which contains an alkaline earth metal anode, an intercalation cathode capable of containing an intercalated ionic species, and a nonaqueous, liquid electrolyte wherein the electrolyte contains an organic solvent and an electrolytically active alkaline earth metal organometallic salt represented by the formulas:

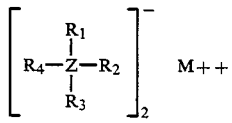 (I)

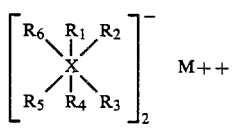 (II)

wherein Z is selected from the group consisting of boron and aluminum and X is selected from phosphorus and arsenic, M is an alkaline earth metal, and $R_1-R_6$ can be the same or different and are independently selected from the following unsubstituted or inertly substituted groups: alkyl, aryl, alkaryl, aralkyl, alkenyl, cycloalkyl, allyl, a heterocyclic alkyl group, and a cyano group with the proviso that $R_1-R_6$ cannot be all alkyl or all aryl and triarylalkylborate or aluminate anions and trialkylarylborate or aluminate anions are excluded.

BRIEF DESCRIPTION OF THE DRAWING

The invention is illustrated by the FIGURE which shows a schematic representation of one embodiment of the cell of the present invention utilizing a nonaqueous electrolyte, a magnesium anode, and a cathode ($Co_3O_4$) capable of intercalating and de-intercalating magnesium ions.

DETAILED DESCRIPTION OF THE INVENTION AND THE PREFERRED EMBODIMENTS

Figure 1:
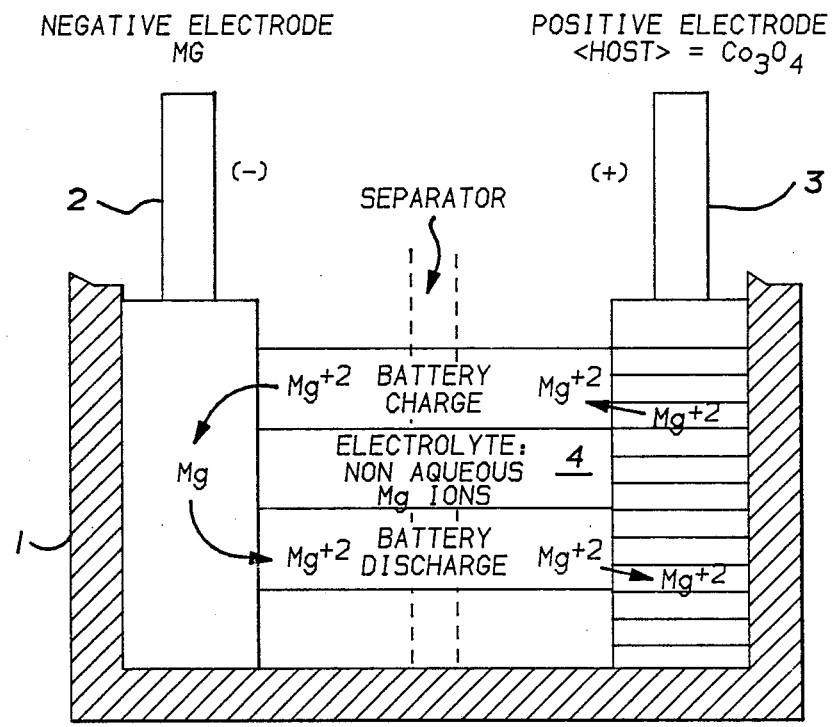

According to the present invention there is provided an electric current producing electrochemical cell which is capable of being recharged. The electrochemical cell contains an alkaline earth metal anode, a transition metal chalcogenide or boride cathode and a nonaqueous electrolyte containing an organometallic alkaline earth metal salt. The cell is operable at ambient temperature defined as about 0° to about 100° C. The organometallic alkaline earth metal salt is a salt having the formula:

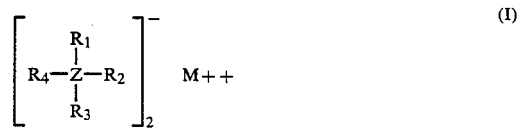 (I)

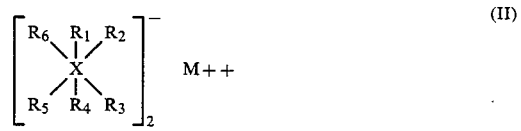 (II)

Z is selected from the group consisting of boron and aluminum and X is selected from phosphorus and arsenic, M is an alkaline earth metal, preferably magnesium or calcium, and $R_1-R_6$ can be the same or different and are independently selected from the following unsubstituted or inertly substituted groups: alkyl, aryl, alkaryl, aralkyl, alkenyl, a cycloalkyl group, an allyl group, a heterocyclic group, and a cyano group with the proviso that $R_1-R_6$ cannot be all alkyl or all aryl and triarylalkylborate or aluminate anions and trialkylarylborate or aluminate anions are excluded. By "inertly substituted" is meant radicals containing substituents which have no detrimental effect upon the electrolytic properties of the electrolyte composition with respect to effectiveness in an electrochemical cell, for instance, halogenated or partially halogenated derivatives of the above groups. Preferably said halogen is fluorine. Said aryl groups generally have 6-18 carbon atoms, preferably 6 carbon atoms, and most preferably are phenyl groups, and said alkyl, alkenyl, cycloalkyl and allyl groups have 1-15, preferably 1-8 and, most preferably have 1-4 carbon atoms. Representative useful organometallic alkaline earth metal boron salts are as follows: magnesium dibutyldiphenylborate (1), magnesium (dicyclopentadienyl diphenyl) borate (2), magnesium dioctylbis (pentafluorophenyl) borate (3), magnesium dioctyl di(trifluoromethyl phenyl) borate (4). Homologous aluminate alkaline earth metal salts are useful.

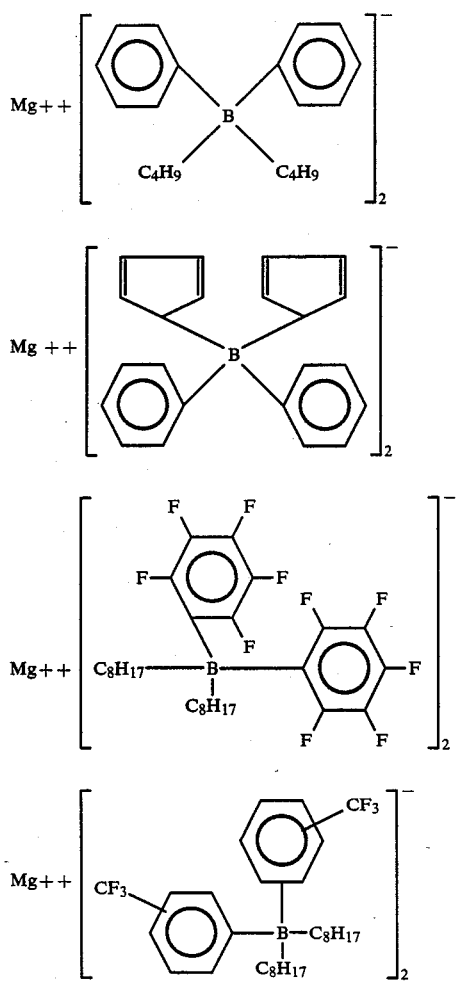

Generally, the anode metal used can be an alkaline earth metal, preferably at least one of magnesium, calcium, strontium, or barium. It may be advantageous to use the anode metal in the form of an alloy with at least one other metal chosen from the metals belonging to groups Ia, IIa, IIb, and IIIb of the Periodic Table of the Elements.

The cathode is generally a substance capable of accepting electrons to form anions by cathodic reduction and is characterized in that the cathode is a structure which is capable of accommodating, as an intercalated species, an ionized form of the metal from which the anode is formed. Thus the cathode can be characterized in that the active cathode material is a material capable of containing an intercalated species in its structure. The cathode generally can be at least one transition metal chalcogenide or transition metal boride including higher borides of transition metals of Groups IVa, Va, and VIa of the Periodic Table of the Elements where the boron to metal ratio is greater than 1.8. Preferably, the cathode is selected from the group consisting of $RuO_2$, $ZrS_2$, $Mn_2O_3$, $Mn_3O_4$, $V_2O_5$, $Co_3O_4$, $CrB_2$, $VB_2$, $NbB_2$, $TiB_2$, $ZrB_2$ and $MoB_2$. Most preferably, the cathode active material is selected from the group consisting of $RuO_2$, $Co_3O_4$, $ZrS_2$, and $V_2O_5$.

Where the cathode is not sufficiently capable of conducting electrons by itself, the cathode can be made electrically conducting by using an auxilliary conducting substance such as graphite or carbon. The cathode can be formed of at least one powdered transition metal chalcogenide or boride, as recited above, and a binder which is inert to the electrolyte, such as polytetrafluoroethylene. In forming the anode, the powdered materials, including a suitable proportion of binder, are formed into the anode structure by compressing the powdered materials, heating if necessary in order to flux the binder.

The organic solvent employed as a portion of the electrolyte composition of the cell of the present invention is generally one having a dielectric constant of about 4 to about 10 and selected from substituted and unsubstituted ethers, esters, sulfones, organic sulfides, organic sulfates, organic nitrates, tertiary amines, and organic nitro compounds. Where substituted solvents are used, these are inertly substituted with respect to reaction conditions within the cell. Any of the foregoing solvents may function either as a diluent or as a complexing solvent with the organometallic alkaline earth metal salt portion of the electrolyte. Preferred useful solvents are selected from straight chain ethers, polyethers, and cyclic ethers and include such ethers as the acetals, ketals, and orthoesters. In addition organic esters, sulfones, organic nitro compounds, tertiary amines, and organic nitrites and organic sulfates and sulfites are useful. Representative useful solvents are furan, sulfolane, dimethylsulfite, nitrobenzene, N,N-dimethylaniline, and nitromethane. Representative examples of preferred organic solvents are tetrahydrofuran, 1,3-dioxolane, 1,2-dimethoxyethane, diethyl ether, trimethoxymethane and 2-methyl tetrahydrofuran. Most preferred solvents are 1,3-dioxolane, 1,2-dimethyloxyethane, tetrahydrofuran and mixtures of these solvents. An especially preferred solvent is one containing 1,3-dioxolane. A more extensive listing of useful organic solvents can be found in U.S. Pat. No. 4,390,604, incorporated herein by reference.

In the drawing, the FIGURE shows schematically one embodiment of the cell of the invention having a cell wall 1 in which a cathode 3 and an anode 2 are contained. The cathode 3 comprises a cathode active material, $Co_3O_4$, which can intercalate magnesium ions. The anode 2 comprises magnesium. The nonaqueous electrolyte 4 is capable of allowing dissolving and replating of the magnesium anode during the operation of the cell. A specific example of a useful electrolyte is a 0.25 molar magnesium dibutyl diphenylborate salt dissolved in 70 percent by volume tetrahydrofuran and 30 percent by volume dimethoxyethane.

When a $Co_3O_4$ cathode is coupled with a magnesium anode in one embodiment of an electrochemical cell of the invention, its half cell reaction is one of ion insertion. The reaction proceeds as follows:

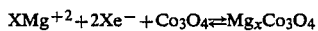

$$XMg^{+2} + 2Xe^- + Co_3O_4 \rightleftharpoons Mg_xCo_3O_4$$

or more generally $XM^{y+} + YXe^- + \text{Host} \rightleftharpoons M_x^{y+}\text{-Host}^{(z-yx)}$, where X=mole fraction or loading of the intercalated ion generally ranging up to 1.0, M=an alkaline earth metal ion, Y=oxidation number for the metal ion, Z=oxidation number for the host meal. Host-=cathode material; for instance, $Co_3O_4$, $Mn_2O_3$, $Mn_3O_4$, or $V_2O_5$. $M_x^{y+}$-Host$^{(z-yx)}$=intercalated product.

This reaction is reversible. The characteristic of an intercalation reaction is the formation of a ternary phase as the product. The phase formed during intercalation retains the physical structure of the parent, for instance, $Co_3O_4$ with only minor variations being evident in the crystallographic lattice constants of the material.

The intercalated product can comprise a ternary phase for magnesium ion proportions up to a maximum characteristic for each host structure and beyond which structural modifications take place in the host material producing multiple crystal phases with the intercalated ion. Structural charges are detrimental and hinder cathode reversibility. The operational range of magnesium loadings are expressed as moles magnesium per mole of cobalt oxide (Host). Throughout the compositional range of x=up to 0.9 mole magnesium per mole of $Co_3O_4$, a single ternary phase is produced. The preferred range for $Co_3O_4$ is 0.7 to 0.8 mole of magnesium per mole of $Co_3O_4$.

The crystallographic structure of the ternary product can be an expanded or contracted form of its parent, i.e., $Co_3O_4$; owing to the insertion or extraction of magnesium ions. The oxidation state of the transition metal (cobalt) can be reversibly altered by the amount of magnesium present in the ternary phase. For example, at the x=0.9 composition, the cobalt ion has an effective oxidation state of +1.2 while at x=0 the ion is at its original oxidation state of +3.

The cell discharge comprises the anodic oxidation of the Mg anode and the cathodic reduction of the cobalt oxide at the cathode. Magnesium dissolved at the anode diffuses into the electrolyte and through a porous separator (the process driven by magnesium ion concentration gradients). Magnesium ions at the surface of the cathode are absorbed to maintain electrical neutrality to counter the cathodic current at this electrode. The magnesium ion then diffuses into the bulk of the cathode to form a ternary phase with the cobalt oxide. This insertion of magnesium ions coupled with the cathodic current reduces the transition metal to complete the electrochemical mechanics of cell discharge. Cell discharge continues until the composition $Mg_{0.9}Co_3O_4$ is reached. At about this point, the useful energy of the cell is exhausted.

The following examples illustrate the various aspects of the invention but are not intended to limit its scope. Where not otherwise specified throughout this specification and claims, temperatures are given in degrees centigrade and parts, percentages, and proportions are by weight.

EXAMPLE 1

Magnesium dibutyldiphenylborate was prepared as follows: Diphenylbromoborate was dissolved in the amount of 7.4 milliliters in 40 milliliters of tetrahydrofuran. The diphenylbromoborate was cooled to −78° C. and the tetrahydrofuran was added. On warming, a reaction took place producing a solid tetrahydrofuran/diphenylbromoborate adduct. This product dissolves as the solution is warmed to room temperature with stirring. Thereafter, 56.3 milliliters of 0.71 molar dibutylmagnesium in hexane was added after first cooling the diphenylbromoborate solution in a dry ice/acetone bath. The reaction mixture was allowed to warm to room temperature with stirring and stirring was continued for one hour. The solvent was evaporated by distillation under reduced pressure and the residue was redissolved in 40 milliliters of tetrahydrofuran. Thereafter, 20 milliliters of 1,4-dioxane were added and the mixture was stirred overnight. Substantial amounts of a white precipitate had formed after this time. The mixture was decanted onto a fine glass frit and the solvent was removed by filtration. As the filtrate was collected, two liquid phases formed and some of the original precipitate dissolved. The bottom layer appears to be the desired product. After stirring the filtrate mixture overnight, a precipitate formed. Analysis showed that this was primarily the desired product, magnesium diphenyldibutylboron.

EXAMPLE 2

A cell having a cathode material of $Co_3O_4$, an anode consisting of magnesium sheet, and an electrolyte comprising magnesium dibutyldiphenylborate (0.25 molar in 70 percent by volume tetrahydrofuran and 30 percent by volume dimethyoxyethane was constructed to show that magnesium dibutyldiphenylborate as an electrolyte will support cell discharge, i.e., intercalation of magnesium ions into the cathode material and recharge, i.e., removal of intercalated magnesium ions from the cathode and plating of magnesium on the anode. The cell cathode of cobalt oxide consisted of 75 percent by weight cobalt oxide, 15 percent by weight carbon black, 10 percent by weight of polytetrafluroethylene. The cathode was rectangular in shape and had an area of 3.2 square centimeters, an active cobalt oxide mass of 36 milligrams and a capacity of 7.9 milliampere hours. In constructing the cell, the cathode was wrapped in one layer of separator; the assembly consisting of one cathode and one anode. This assembly was inserted into a polyethylene bag which was heat sealed and sandwiched between two glass plates. The cell was tested at constant current in an inert atmosphere. Voltage versus time traces were recorded on a standard laboratory chart recorder. The pertinent cell parameters from this test are as follows: discharge current was 0.87 milliamps. Open circuit voltage was 1.2 volts. The delivered capacity was 6.9 milliampere hours. The current efficiency was 91 percent. The operational voltage was 0.37 volt. The cathode utilization was 88 percent.

EXAMPLE 3

(control forming no part of this invention)

Magnesium tributylphenyl borate was prepared as follows: Diphenylmagnesium was prepared by the metathetical reaction of diphenylmercury with activated magnesium.

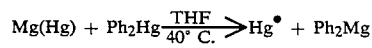

1.52 g of Mg (62½ mmol) and 3.3 g of $HgCl_2$ (12½ mmole) were stirred together in THF. The following reaction was expected:

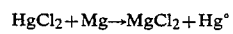

The white precipitate which formed ($MgCl_2$) was removed by washing the black residue with six 25-ml portions of tetrahydrofuran (THF) and drying under vacuum.

To the activated magnesium (magnesium amalgam), thus produced, was added 7.10 g (20 mmol) of diphenyl mercury, $Ph_2Hg$. THF was added to give a total volume of 25 ml. The mixture was stirred for 2 hours whereupon IR spectroscopy indicated complete reaction to diphenyl magnesium. (Some preparations required heating to 40° to initiate the reaction.) The mixture was filtered through diatomaceous earth to yield a yellow solution, slightly cloudy with a black material which was thought to be magnesium. This was allowed to settle and the yellow solution was decanted off. All reactions were performed in an atmosphere of purified argon.

Tributylboron solution 40 ml (BBu$_3$ 1 mola in Hexane) was pipetted into a reaction vessel. The diphenyl magnesium prepared above was slowly added with stirring. The mixture was stirred for one hour after the addition was complete. The slightly cloudy solution was filtered through diatomaceous earth and evaporated to dryness under reduced pressure yielding a white powder of magnesium tributylphenylborate.

The compound Mg[R$_3$R'B]$_2$, where R-butyl and R'=phenyl when evaluated as an electrolyte salt in a cell made in accordance with that described in Example 1, does not permit the intercalation reaction of Mg into a Co$_3$O$_4$ cathode material. With a RuO$_2$ cathode, the intercalation of Mg ions does take place but only to an extent of about 5% of the potential capacity of the cathode, thus rendering this electrolyte salt essentially useless. Magnesium has however been successfully electrodeposited onto a magnesium anode from solutions of this compound in ethers.

EXAMPLES 4-6

(controls, forming no part of this invention)

The compounds Mg[R$_3$R'B]$_2$ where R=phenyl and R'=butyl; R and R'=phenyl; and R and R'=butyl when evaluated as electrolyte salts in a cell made in accordance with that described in Example 1 do not permit both intercalation of magnesium ions into the cathode and plating of magnesium on the anode. The tetrabutylborate salt permitted plating of magnesium but not intercalation. The tetraphenylborate salt permitted intercalation but not plating. The triphenylbutylborate salt permitted intercalation but not plating.

While this invention has been described with reference to certain embodiments, it will be recognized by those skilled in the art that many variations are possible without departing from the spirit and scope of the invention and it will be understood that it is intended to cover all changes and modifications of the invention disclosed herein for the purpsoes of illustration which do not constitute departures from the spirit and scope of the invention.

The embodiments of the invention in which an exclusive property or privilege is claimed are defined as follows:

1. In an electrochemical cell containing an alkaline earth metal anode, an intercalation cathode, and a nonaqueous, liquid electrolyte, the improvement comprising:

using as said electrolyte
(A) at least one organic solvent and
(B) at least one electrolytically active alkaline earth metal salt represented by the formula:

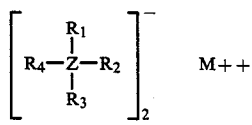    M++    (I)

-continued

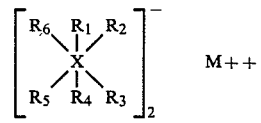    M++    (II)

in which Z is selected from the group consisting of boron and aluminum; X is selected from the group consisting of phosphorus and arsenic; M is an alkaline earth metal; and in which R$_1$-R$_6$ can be the same or different and are radicals independently selected from the group consisting of unsubstituted or inertly substituted alkyl, aryl, aralkyl, alkaryl, alkenyl, cycloalkyl, allyl, heterocyclic alkyl, and cyano groups with the proviso that R$_1$-R$_6$ cannot be all alkyl or all aryl and triarylalkylborate or aluminate anions and trialkylarylborate or aluminate anions are excluded, wherein said intercalation cathode is capable of containing an intercalated ionic species in its structure.

2. The cell of claim 1 wherein said alkaline earth metal anode is selected from at least one of the group consisting of magnesium and calcium, M is an alkaline earth metal selected from the group consisting of magnesium and calcium, Z is boron, and said cathode active material is selected from the group consisting of at least one of a transition metal chalcogenide or transition metal boride.

3. The cell of claim 2 wherein said cell is a rechargeable cell; said organic solvent has a dielectric constant of about 4.0 to about 10.0 and is selected from the group consisting of inertly substituted and unsubstituted ethers, esters, sulfones, organic sulfides, organic sulfates, organic nitrites, tertiary amines, and organic nitro compounds; and said cathode active material is selected from at least one of the group consisting of RuO$_2$, ZrS$_2$, Mn$_2$O$_3$, Mn$_3$O$_4$, V$_2$O$_5$, Co$_3$O$_4$, CrB$_2$, VB$_2$, NbB$_2$, TiB$_2$, TaB$_2$, ZrB$_2$, and MoB$_2$.

4. The cell of claim 3 wherein said organic solvent is an ether and wherein the organic radicals, R$_1$-R$_6$, are radicals individually selected from the group consisting of aryl of 6-18 carbon atoms, and 1 to 15 carbon atom alkyl, alkenyl, cycloalkyl, and allyl and halogenated or partially halogenated derivatives thereof.

5. The cell of claim 4 wherein said organic solvent is selected from the group consisting of straight chain ethers, polyethers, cyclic ethers, acetals, ketals, and orthoesters and R$_1$-R$_6$ are individually selected from alkyl groups of 1-8 carbon atoms and phenyl.

6. The cell of claim 5 wherein said ethers are selected from the group consisting of tetrahydrofuran, dioxolane, and dimethyoxyethane, and R$_1$-R$_6$ are radicals individually selected from phenyl, ethyl, propyl, and butyl.

7. The cell of claim 6 wherein said cell is operable at ambient temperature.

8. The cell of claim 7 wherein said ambient temperature is about 0° to about 100° C.

9. The cell of claim 8 wherein said electrolytically active alkaline earth metal salt is selected from the group consisting of magnesium dibutyldiphenylborate, magnesium (dicyclopentadienyl diphenyl) borate, magnesium dioctylbis (pentafluorophenyl) borate, and magnesium dioctyl di(trifluoromethyl phenyl) borate.

10. The cell of claim 9 wherein said transition metal chalcogenide cathode is selected from the group consisting of RuO$_2$, Co$_3$O$_4$, ZrS$_2$, and V$_2$O$_5$ and said salt is magnesium dibutyldiphenylborate.

11. The compound magnesium dibutyldiphenylborate.

* * * * *

UNITED STATES PATENT AND TRADEMARK OFFICE
CERTIFICATE OF CORRECTION

PATENT NO.   :   4,894,302

DATED        :   January 16, 1990

INVENTOR(S)  :   Ronald J. Hoffman, Richard C. Winterton, Thomas D. Gregory

It is certified that error appears in the above-identified patent and that said Letters Patent is hereby corrected as shown below:

Col. 5, line 67, "Mn20$_3$" should read -- $Mn_2O_3$ --.

Col. 6, lines 38-39, "1,2-dimethyloxyethane" should read -- 1,2-dimethoxyethane --;

line 67, "meal" should read -- metal --.

Col. 9, line 11, "mola" should read -- molar --;

line 48, "purpsoes" should read -- purposes --.

Col. 10, line 50, "dimethyoxyethane" should read -- dimethoxyethane --;

line 51, the words -- the group consisting of -- should be inserted between "from" and "phenyl".

Signed and Sealed this

Sixteenth Day of April, 1991

Attest:

HARRY F. MANBECK, JR.

Attesting Officer

Commissioner of Patents and Trademarks